Jan. 16, 1962 — R. C. KELLER — 3,016,758
TRANSMISSION CONTROL
Filed Nov. 24, 1958 — 2 Sheets-Sheet 2

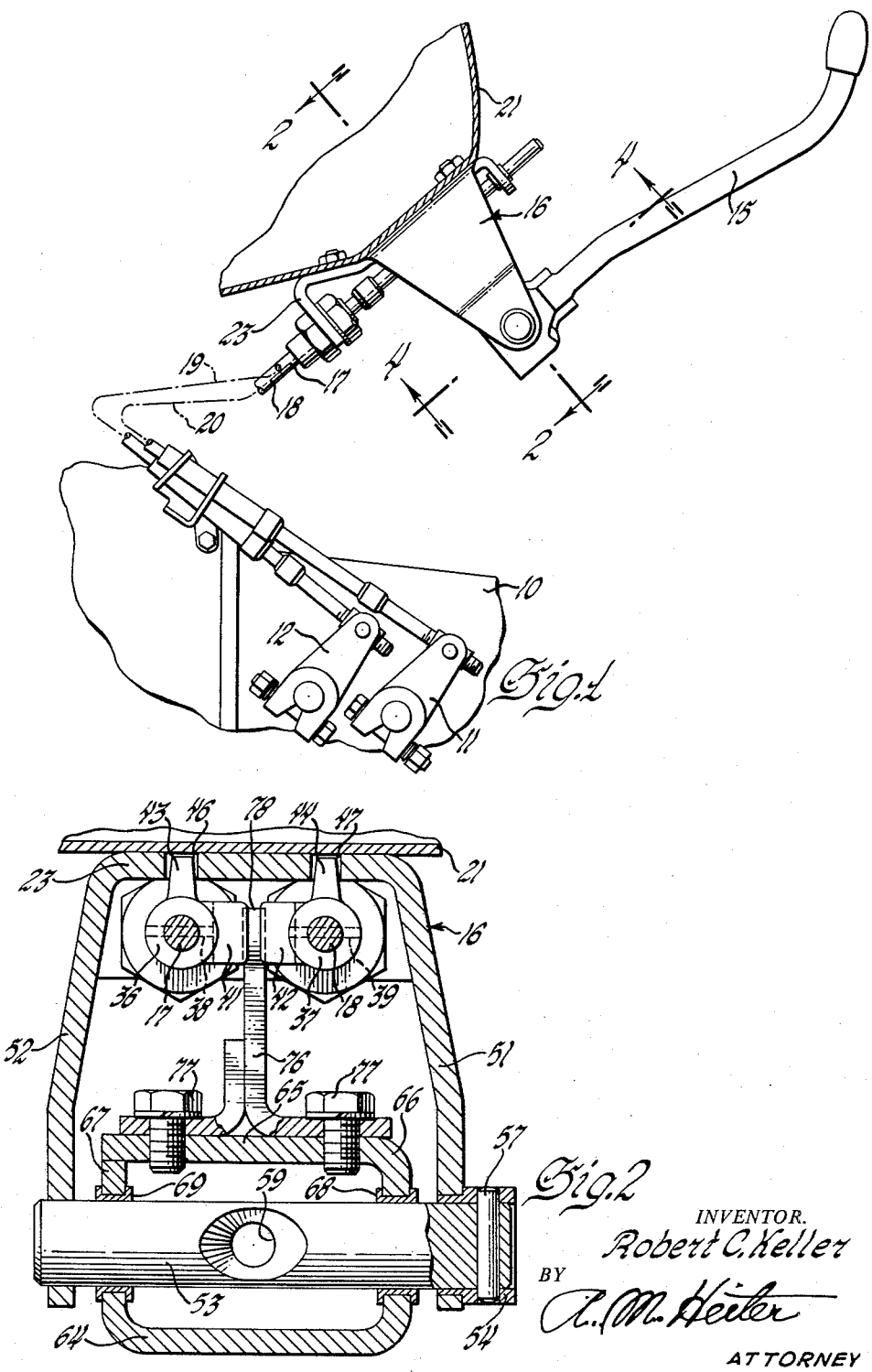

INVENTOR.
Robert C. Keller
BY
A. M. Heiter
ATTORNEY

United States Patent Office 3,016,758
Patented Jan. 16, 1962

3,016,758
TRANSMISSION CONTROL
Robert C. Keller, Detroit, Mich., assignor to General Motors Corporation, Detroit, Mich., a corporation of Delaware
Filed Nov. 24, 1958, Ser. No. 775,967
12 Claims. (Cl. 74—473)

This invention relates to a transmission control mechanism and particularly to a transmission control linkage for selectively actuating transmission control devices.

The transmission control linkage employs a hand lever which may be rocked laterally to selectively engage one of several control members and then rotated about the axis in either direction to move the selected control member. The control members are connected to the transmission operating mechanism by a suitable linkage such as a Bowden cable. The hand lever is connected to the control members by a linkage including a fixed supporting shaft and a bracket rotatably mounted on the shaft and having an arm or lever extending to engage cam surfaces on the control members. The hand lever is universally pivoted at one end to the supporting shaft and pivoted at an intermediate point by a transverse pin to the rotatable bracket. Thus, lateral rocking movement of the hand lever will laterally move the bracket, and rotary movement about the axis of the shaft will rotate the bracket about in the shaft.

An object of the invention is to provide in a transmission control linkage a simple and sturdy interconnection between a rotatably and rockably mounted hand lever for selectively engaging one or more control members and for reciprocating the engaged control member.

Another object of the invention is to provide in a transmission control linkage a simple support having bearing surfaces to guide one or more control members for reciprocal movement without rotation and to provide a support for a hand lever and associated linkage laterally movable to selectively engage a selective control member and rotatable to axially move the selected control member.

Another object of the invention is to provide in a transmission control linkage a bracket supoprting a plurality of control members for reciprocal movement and restraining them against rotary movement and for supporting a transversely located support shaft, a hand lever universally pivoted to the support shaft and transversely pivoted to a bracket rotatably mounted on the support shaft for laterally moving the bracket and rotating the bracket about the axis of the support shaft and a lever connected to the bracket to selectively engage one of said control members and to reciprocate the control members on rotary movement of the hand lever.

These and other objects of the invention will be more apparent from the following specification and drawing illustrating a preferred embodiment of the invention.

FIG. 1 illustrates the transmission control linkage assembly.

FIG. 2 is an enlarged partial section of FIG. 1 taken on the line 2—2.

Figure 3:
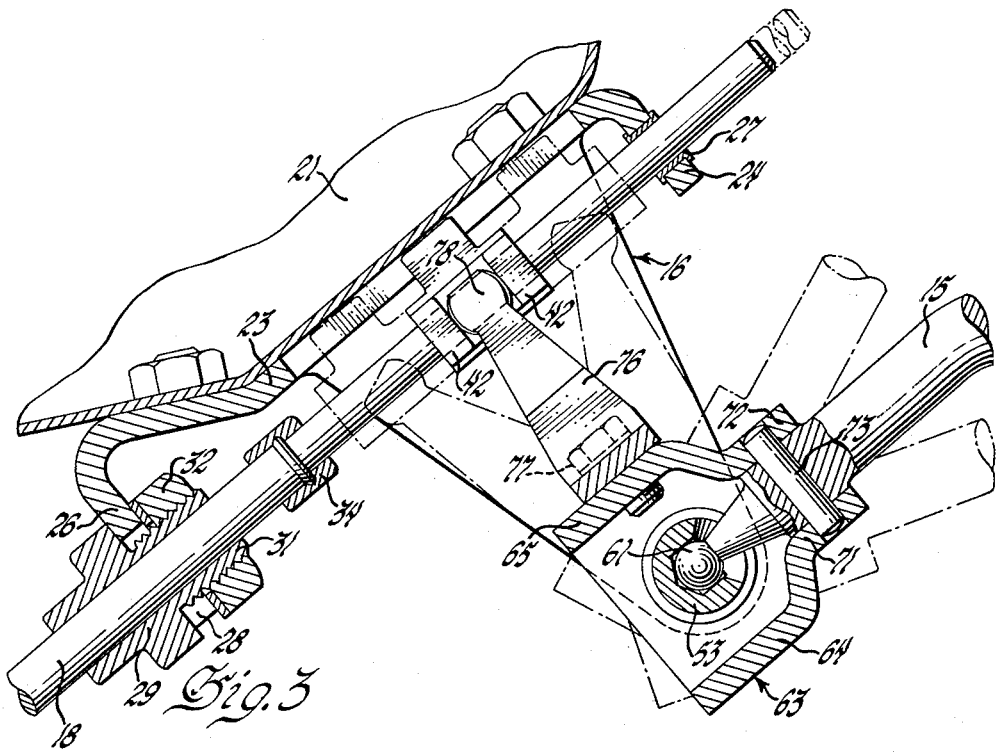
FIG. 3 is an enlarged view of a portion of the control linkage illustrated in FIG. 1 with parts broken away and in section.
Figure 4:
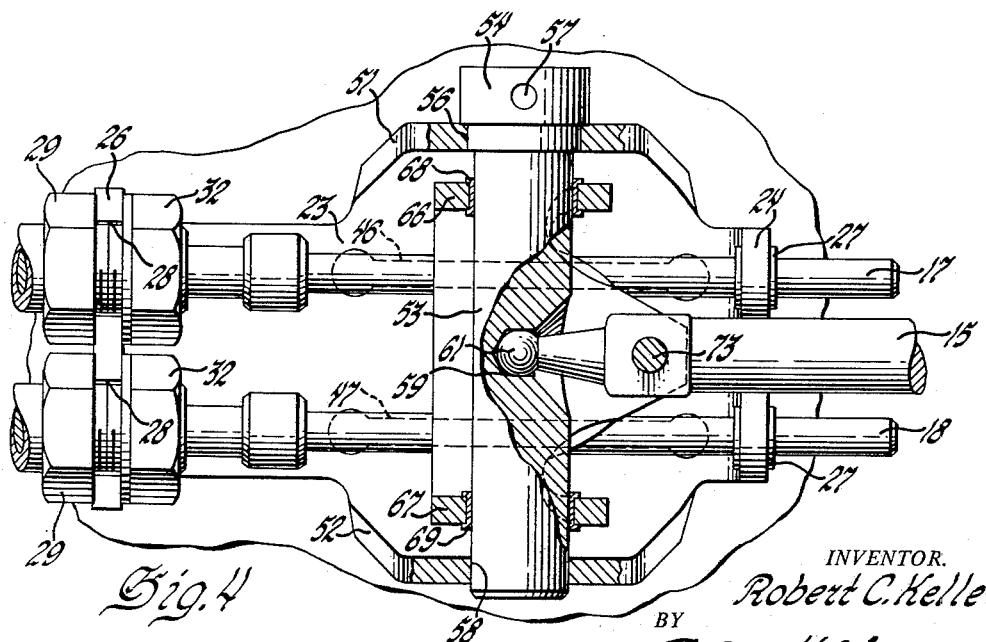
FIG. 4 is an enlarged sectional view of FIG. 1 on the line 4—4.

A transmission control linkage made in accordance with the invention is illustrated in FIG. 1 and may be employed to control the transmission 10 which has two shift levers 11 and 12 functioning in a conventional manner to operate shift forks (not shown). Each of the levers 11 and 12 is normally located in a neutral position and may be rotated through a limited angle in one direction to provide one ratio and in the opposite direction to provide another ratio, while the other lever remains in the neutral position. The hand lever 15 is rotatably and rockably mounted on a bracket 16 to selectively reciprocate the control members 17 and 18 which are connected through suitable linkages or Bowden wire controls 19 and 20 to actuate the shift forks 11 and 12 respectively. The support 16 may be fixed to any suitable portion of the vehicle such as the dash panel 21 to locate the handle 15 conveniently for manual control by the operator.

The handle 15 is connected to the control members 17 and 18 by a linkage mechanism mounted on the support 16. The support 16 has a suitable base 23 having a pair of guide ears 24 and 26 at opposite ends to reciprocally support the control members 17 and 18. The ear 24 has a pair of bearing inserts 27. The ear 26 has a pair of slots 28 which adjustably receive the adjustable bearing members 29, which have a threading portion 31 extending through the slots 28. A nut or fastener 32 threaded on portion 31 secures the bearing 29 in adjusted position on the ear 26.

The control members 17 and 18 which may be made in two parts and secured together by the coupling 34 have cam members 36 and 37 secured thereto by suitable pins 38 and 39. The cam members 36 and 37 each have a pair of cam projections 41 and 42 respectively facing each other. The cam members 36 and 37 also have the guide portions 43 and 44 extending into slots 46 and 47 respectively in the base 23 to prevent rotation of the rods 17 and 18.

The support 16 also has a pair of support ears 51 and 52 extending from the side of the base 23 in the same direction as the ears 24 and 26. A support shaft 53 is supported in a fixed position on the ears 51 and 52 by a bushing 54 located in an aperture 56 in the ear 51 and secured by suitable means such as welding to the ear 51 and secured to the shaft 53 by a pin 57. The shaft 53 at the other end is supported in an aperture 58 in the ear 52. Centrally located in the shaft 53 is a universal joint socket 59 which receives the ball 61 on the end of the hand lever 15 to universally support the hand lever on the shaft 53. The bracket 63 has side walls 64 and 65 located on opposite sides of the shaft and end walls 66 and 67. Bearing inserts 68 and 69 located in apertures in the end walls 66 and 67 rotatably and axially slidably support the bracket 63 on the shaft 53. The bracket 63 also has a pair of ears 71 and 72 on which the handle 15 is pivotally mounted by the pin 73 which extends through suitable apertures in the handle and ears 71 and 72. The pin connection between the hand lever and the bracket 63 permits axial pivotal movement or lateral rocking movement of the hand lever and prevents movement of the hand lever 15 relative to the bracket 63 in a rotary direction about the axis of the shaft 53. A lever 76 secured by suitable means such as the stud 77 to the wall 65 of the bracket 63 has a rounded cam 78 which fits between both pair of cam projections 41 and 42.

The handle 15 as illustrated in the solid line position is in the conventional neutral position. It will be noted that the lever 76 is wider than the space between the cam projections 41 and 42 and thus in neutral, as best shown in FIG. 2, the lever 76 cannot move one control member 17 or 18 without moving the other. This will prevent rotary movement of the hand lever 15 about the axis of the shaft 53 and reciprocation of either control member 17 or 18 since conventional transmissions have an interlock mechanism preventing simultaneous movement from neutral of both levers 11 and 12.

In order to select one of the control members 17 or 18 for actuation, the hand lever is rocked laterally or rotated along the axis of the shaft 53 about the universal joint formed by the ball 61 and socket 59. Lateral movement of the hand lever 15 through the pin 73 will move the intermediate member consisting of the bracket 63 and lever 76 laterally in the same direction. Thus, the lever 76 moves with the bracket 63 so that the cam member 78 fully engages one of the cam members 36 or 37 and is completely disengaged from the other. Then the hand lever 15 may be rotated about the axis of the shaft 53 to a limited degree in either direction as shown by the dotted line positions in FIG. 3 to move the selected control member 17 or 18 in either direction.

The above described preferred embodiment is illustrative of the invention which may be modified within the scope of the appended claims.

I claim:

1. In a transmission control linkage, a support, a pair of control members reciprocally mounted on said support, cam means on each of said control members, said support having an axis spaced from said control members, a lever pivoted to said support for axial and rotary movement with respect to said axis, an intermediate member rotatably and axially slidably mounted with respect to said axis on said support, said lever being pivoted to said intermediate member at a point spaced from the pivot between the lever and support, said intermediate member having a cam actuator cooperating with said cam means on said control members, said intermediate member sliding axially in response to axial rocking movement of said lever along the axis of said support to move said cam actuator to selectively engage one of said cam means on one control member and to reciprocate the selected one of said control members in response to rotary movement of said intermediate member and lever.

2. In a transmission control linkage, a support, a pair of control members reciprocally mounted on said support, cam means on each of said control members, said support including a shaft having an axis extending transversely and spaced from said control members, a lever pivoted to said support for axial and rotary movement with respect to said axis, an intermediate member rotatably and axially slidably mounted on said shaft for rotary and axial movement with respect to said axis, said lever being pivoted to said intermediate member transversely of the axis of said shaft and spaced from the pivot between the lever and support, and said intermediate member having a cam actuator cooperating with said cam means on said control members, said intermediate member sliding axially in response to axial rocking movement of said lever along the axis of said shaft to move said cam actuator to selectively engage one of said cam means on one control member and to reciprocate the selected one of said control members in response to rotary movement of said intermediate member and lever.

3. The invention defined in claim 2 and said support being mounted on the dash panel of a vehicle, a transmission having a pair of actuator members, cable means connecting said control members to said actuator members.

4. In a transmission control linkage, a support, a pair of control members reciprocally mounted on said support, cam means on each of said control members, a shaft fixedly mounted on said support and having an axis extending transversely and spaced from said control members, a lever pivoted to said shaft, an intermediate member rotatably and axially slidably mounted on said shaft for rotary and axial movement with respect to said axis, said lever being pivoted to said intermediate member transversely of the axis of said shaft and spaced from said pivot, and said intermediate member having a cam actuator means cooperating with said cam means on said control members, said intermediate member sliding axially in response to axial rocking movement of said lever along the axis of said shaft to move said cam actuator to selectively engage one of said cam means on one control member and to reciprocate the selected one of said control members in response to rotary movement of said intermediate member and lever.

5. The invention defined in claim 4 and said pivot between said lever and shaft consisting of a socket in said shaft and a ball on the end of said lever.

6. In a transmission control linkage, a support, a pair of control members reciprocally mounted on said support, cam means on each of said control members, guide means on said control members and said support to prevent rotation of said control members, said support including a shaft having an axis extending transversely and spaced from said control members, a lever pivoted to said support, an intermediate member rotatably and axially slidably mounted on said shaft for rotary and axial movement with respect to said axis, said lever being pivoted to said intermediate member transversely of the axis of said shaft and spaced from the pivot between said lever and said support, and said intermediate member having a cam actuator cooperating with said cam means on said control members, said intermediate member sliding axially in response to axial rocking movement of said lever along the axis of said shaft to move said cam actuator to selectively engage one of said cam means on one control member and to reciprocate the selected one of said control members in response to rotary movement of said intermediate member and lever.

7. The invention defined in claim 6 and said cam means on each control member being a recess, said recesses facing each other and said cam actuator engaging both said recesses in a neutral position.

8. In a transmission control linkage, a support having a base and a pair of guide ears at opposite ends of the base and a pair of support ears on opposite sides of the base, a pair of control members reciprocally mounted in said guide ears, cam means on each of said control members, guide means on said control members and said support to prevent rotation of said control members, said support including a shaft supported on said support ears and having an axis extending transversely and spaced from said control members, a lever pivoted to said support, an intermediate member rotatably and axially slidably mounted on said shaft for rotary and axial movement with respect to said axis, said lever being pivoted to said intermediate member transversely of the axis of said shaft and spaced from the pivot between said lever and said support, and said intermediate member having a cam actuator cooperating with said cam means on said control members, said intermediate member sliding axially in response to axial rocking movement of said lever along the axis of said shaft to move said cam actuator to selectively engage one of said cam means on one control member and to reciprocate the selected one of said control members in response to rotary movement of said intermediate member and lever.

9. In a transmission control linkage, a support having a base and a pair of guide ears at opposite ends of the base and a pair of support ears on opposite sides of the base, a pair of control members reciprocally mounted in said guide ears, cam means on each of said control members, guide means on said control members and said support to prevent rotation of said control members, a shaft supported on said support ears extending transversely and having an axis spaced from said control members, a lever pivoted to said shaft, an intermediate member rotatably and axially slidably mounted on said shaft for rotary and axial movement with respect to said axis, said lever being pivoted to said intermediate member transversely of the axis of said shaft and spaced from the pivot between said lever and said shaft, and said intermediate member having a cam actuator cooperating with said cam means on said control members, said intermediate member sliding axially in response to axial rocking movement of said lever along the axis of said shaft to move said cam actuator to engage one of said cam means on one control member and to reciprocate said one control member in response to rotary movement of said intermediate member and lever.

10. The invention defined in claim 9 and said control members being located parallel to each other, said cam means on each control member consisting of a recess, said recesses facing each other and said cam actuator engaging both cams in a neutral position.

11. In a transmission control linkage, a support having a base and a pair of guide ears at opposite ends of the base and a pair of support ears on opposite sides of the base, said guide ears and support ears extending from said base in the same direction, a pair of control members reciprocally mounted in said guide ears, cam means on each of said control members, guide means on said control members and said support to prevent rotation of said control members, a shaft supported on said support ears and having an axis extending transversely to and spaced from said control members, a hand lever pivoted to said shaft, an intermediate member rotatably and axially slidably mounted on said shaft, said hand lever being pivoted to said intermediate member transversely of the pivot on said shaft, and said intermediate member having a cam actuator cooperating with said cam means on said control members, said intermediate member sliding axially in response to axial rocking movement of said hand lever along the axis of said shaft to move said cam actuator to engage one of said cam means on one control member and to reciprocate said one control member in response to rotary movement of said intermediate member and hand lever.

12. In a transmission control linkage, a support having an axis, a pair of controlled members reciprocally mounted on said support, cam means on each of said controlled members, a lever having a portion pivoted to said support for axial and rotary movement of said lever with respect to said axis, a control member mounted on said support for axial movement and transverse movement relative to said axis, said lever being pivotally connected at a point spaced from said pivoted portion to said control member to axially move said control member in response to axial movement of said lever and to transversely move said control member in response to rotary movement, a cam actuator on said control member cooperating with said cam means to selectively engage one cam means of one controlled member in response to one movement of said control member and to move said one cam means and one controlled member in response to the other movement of said control member.

References Cited in the file of this patent

UNITED STATES PATENTS

| | | |
|---|---|---|
| 1,550,029 | Johnson | Aug. 18, 1925 |
| 1,896,893 | Hartsock | Feb. 7, 1933 |
| 2,012,669 | Lapsley | Aug. 27, 1935 |
| 2,026,444 | Trott | Dec. 31, 1935 |
| 2,517,871 | Gustafson | Aug. 8, 1950 |
| 2,547,317 | Gustafson | Apr. 3, 1951 |